(12) United States Patent
Haumont

(10) Patent No.: US 6,466,552 B1
(45) Date of Patent: Oct. 15, 2002

(54) GROUP TRANSMISSION IN A PACKET RADIO NETWORK

(75) Inventor: Serge Haumont, Helsinki (FI)

(73) Assignee: Nokia Telecommunications Oy, Espoo (FI)

(*) Notice: Subject to any disclaimer, the term of this patent is extended or adjusted under 35 U.S.C. 154(b) by 0 days.

(21) Appl. No.: 09/319,181

(22) PCT Filed: Dec. 1, 1997

(86) PCT No.: PCT/FI97/00741

§ 371 (c)(1),
(2), (4) Date: Jun. 2, 1999

(87) PCT Pub. No.: WO98/25422

PCT Pub. Date: Jun. 11, 1998

(30) Foreign Application Priority Data

Dec. 2, 1996 (FI) .................................................. 964818

(51) Int. Cl.[7] .............................................. H04B 7/00
(52) U.S. Cl. ...................................... 370/310; 370/471
(58) Field of Search ................................ 370/252, 349, 370/351, 360, 389, 390, 392, 400, 471, 480, 326, 310

(56) References Cited

U.S. PATENT DOCUMENTS 5,325,432 A    6/1994   Gardeck et al.
5,471,646 A   11/1995   Schultz
5,473,642 A * 12/1995   Osawa et al. ................ 375/377
5,519,704 A    5/1996   Farinacci et al.
5,566,181 A   10/1996   Huang et al.

FOREIGN PATENT DOCUMENTS

WO        WO 96/31992        10/1996

OTHER PUBLICATIONS

Copy of International Search Report for PCT/FI97/00741.

* cited by examiner

*Primary Examiner*—Wellington Chin
*Assistant Examiner*—Brenda Pham
(74) *Attorney, Agent, or Firm*—Altera Law Group, LLC

(57) ABSTRACT

The invention relates to a method and apparatus for transmitting group messages in a packet radio network comprising at least one support node and a plurality of group members and at least one defined area. The support node knows the identity of group members in said area. The network comprises broadcast connections and point-to-point connections. The method according to the invention comprises: keeping track of the group members that have not received the group message and determining whether or not their number exceeds a predetermined threshold; in response to a positive determination in the previous step, transmitting the group message over a broadcast connection; and in response to a negative determination, transmitting the group message to the group members over a point-to-point connection.

17 Claims, 3 Drawing Sheets

GROUP TRANSMISSION IN A PACKET RADIO NETWORK

FIELD OF THE INVENTION

The present invention relates in general to packet radio systems and more particularly, the invention relates to a method and an arrangement for broadcasting group messages in a packet radio network, preferably a mobile packet radio network, such as GPRS.

BACKGROUND OF THE INVENTION

Mobile communication systems have been developed because it has been necessary to be able to reach people even when they are not close to a fixed telephone terminal. As the use of different data transmission services in offices has increased, different data services have also been introduced into mobile communication systems. Portable computers enable efficient data processing everywhere the user moves. Mobile communication networks in turn provide the user with an efficient access network to actual data networks for mobile data transmission. In order to realize this, different new data services are designed for existing and future mobile communication networks. Digital mobile communication systems, such as the pan-European mobile communication system GSM (Global System for Mobile Communication), support particularly well mobile data transmission.

General Packet Radio Service (GPRS) is a new service in the GSM system, and it is one the items of the standardization work of the GSM phase 2+ in ETSI (European Telecommunication Standard Institute). The GPRS operational environment consists of one or more sub-network service areas, which are interconnected by a GPRS backbone network. A sub-network comprises a number of packet data service nodes, which are referred to as GPRS support nodes (or agents) in this context, each packet data service node being connected to a GSM mobile communication network in such a manner that it is capable of providing a packet data service for mobile data terminal equipment via several base stations, i.e. cells. The intermediate mobile communication network provides circuit switched or packet switched data transmission between a support node and mobile data terminal equipment. Different sub-networks are connected to an external data network, such as a public switched packet data network PSPDN. The GPRS service thus produces packet data transmission between mobile data terminal equipment and external data networks, a GSM network acting as an access network. One aspect of the GPRS service network is that it operates almost independently of the GSM network. One of the requirements set for the GPRS service is that it must operate together with external PSPDNs of different types, for instance with the Internet or X.25 networks. In other words, the GPRS service and a GSM network should be capable of serving all users, irrespective of the type of data networks they want to register in via the GSM network. This means that the GSM network and the GPRS service have to support and process different network addressing methods and data packet formats. This data packet processing also comprises the routing the packets in a packet radio network. In addition, the users should be able to roam from a GPRS home network to an external GPRS network, the operator of which has a backbone network that may support a protocol (for instance CLNP) that is different from the one supported by the home network (for instance X.25).

Referring to FIG. 1, a typical arrangement in a GPRS network will now be described. It should be understood that the architecture of GPRS systems is not as advanced as that of GSM systems. Therefore, all GPRS terms should be interpreted as being descriptive rather than limiting terms. A typical mobile station constituting mobile data terminal equipment consists of a mobile station MS in a mobile communication network, and a portable computer PC connected to the data interface of said mobile station MS. The mobile station MS may be for instance a Nokia 2110, which is manufactured by Nokia Mobile Phones Ltd., Finland. By means of a PCMCIA-type Nokia Cellular Datacard, which is manufactured by Nokia Mobile Phones Ltd., the mobile station can be connected to any portable PC which is provided with a PCMCIA card location. The PCMCIA card thus provides the PC with an access point, which supports the protocol of the telecommunication application used in the PC, for instance CCITT X.25 or Internet Protocol IP. Alternatively, the mobile station may directly provide an access point which supports the protocol used by the PC application. Furthermore, it is possible that the mobile station MS and the PC are integrated into a single unit within which the application program is provided with an access point supporting the protocol used by it. An example of such a mobile station with an integrated computer is the Nokia Communicator 9000, also manufactured by Nokia Mobile Phones Ltd., Finland.

Network elements BSC and MSC are known from a typical GSM network. The arrangement of FIG. 1 includes a separate support node SGSN (Serving GPRS Support Node) of the GPRS service. This support node SGSN controls certain operations of the packet radio service on the network side. Such operations comprise logging on and off the system by the mobile stations MS, routing area updates of the mobile stations MS, and routing of data packets to their correct targets. Within this application, the concept of "data" should be understood broadly to cover any information transferred in a digital communication system. Such information can comprise speech coded into digital form, data transmission between computers, telefax data, short segments of program code, etc. The SGSN node can be located at a BTS or at a BSC or at an MSC, or it can be located separately from any of these elements. The interface between a SGSN node and the Base Station Controller BSC is called a GB interface.

In a GPRS system the term "group" is used to refer to a plurality of mobile stations MS that are registered with a common International Mobile Group Identifier (IMGI). A message that is to be sent to all members of a group is called a "group message". There can be open groups and closed groups but the present invention is equally applicable to both types of groups.

Two types of Point-To-Multipoint (PTM) services are defined in GPRS:

PTM-Multicast (PTM-M); and

PTM-Group (PTM-G).

For controlling transmissions of Point-To-Multipoint messages, a GPRS system typically comprises a Point-To-Multipoint Service Center, PTM-SC, also known as a PTM server.

PTM-M is a service for broadcasting data sent by a service provider over a geographical area, such as a city. The geographical area for which a PTM-M message is destined can be defined in the message from the service provider to the PTM server PTM-SC. PTM-M service supports neither secure delivery nor security of data. This means that anyone sending messages using PTM-M service cannot be sure that the message will be delivered to the receiving party. Due to the nature of the PTM-M service, anyone can listen to it, and therefore, no data security is guaranteed.

In PTM-G transmission the delivery can optionally be secure and the data are ciphered. (The current understanding is that the SGSN establishes a connection similar to Point-To-Point (PTP) with each mobile station which has a group registration in the geographical area). The security of the transmission is the same as over the Point-To-Point connection.

Thus in prior art packet radio systems, the same PTM-G message will be sent X times if there are X subscribers in a certain routing area. It can be noted that with the increasing use of PTM-G transmissions, a large amount of traffic will be generated over the air interface of packet radio systems.

DISCLOSURE OF THE INVENTION

Based on the foregoing description, it is an object of the present invention to create a method and an arrangement for PTM-G message transmission that do not suffer from the above drawbacks. The object of the invention will be achieved with a method and an arrangement which are characterized by what is disclosed in the appended independent claims. Advantageous embodiments of the present invention will be presented in the dependent claims.

The invention is based on the idea of sending a PTM-G group message over a combination of broadcast and point-to-point (PTP) connections. When the message is broadcast, it is sent in a way similar to the way the PTM-M message is sent (i.e. broadcast) but in a ciphered form. A selection algorithm will be used to determine the optimal transmission mode (broadcast or point-to-point transmission). Broadcast transmission will be used if it is determined that this mode of transmission loads the network less than point-to-point transmission. In a simple embodiment of the algorithm, the number of those group members in the destination area of the group message that have not yet received the group message will be compared to a predetermined (not necessarily fixed) threshold. If the number of these remaining group members exceeds this threshold, broadcast transmission will be used, possibly with a few repetitions. Unlike the current PTM-M recommendations, the group message will be preferably acknowledged by the mobile stations that receive the message correctly. Then the group message can be sent to the remaining mobile stations via PTP connections like in prior art methods and systems.

BRIEF DESCRIPTION OF THE DRAWINGS

In the following, the invention will be described by means of preferred embodiments with reference to the accompanying drawing, in which.

DETAILED DESCRIPTION OF THE INVENTION

Figure 1:
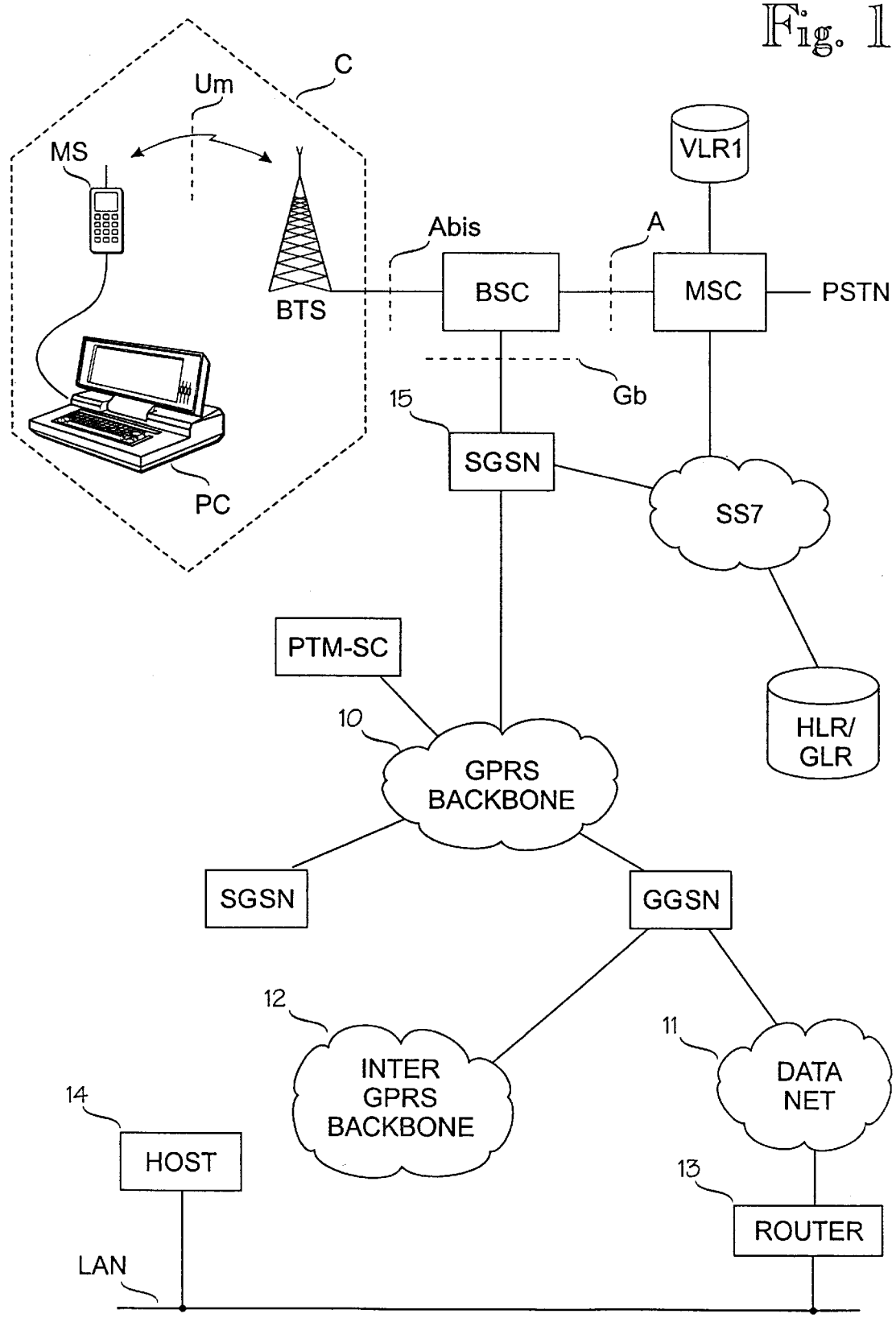
FIG. 1 is a block diagram illustrating some of the elements of a packet radio system to which the invention relates.
Figure 2:
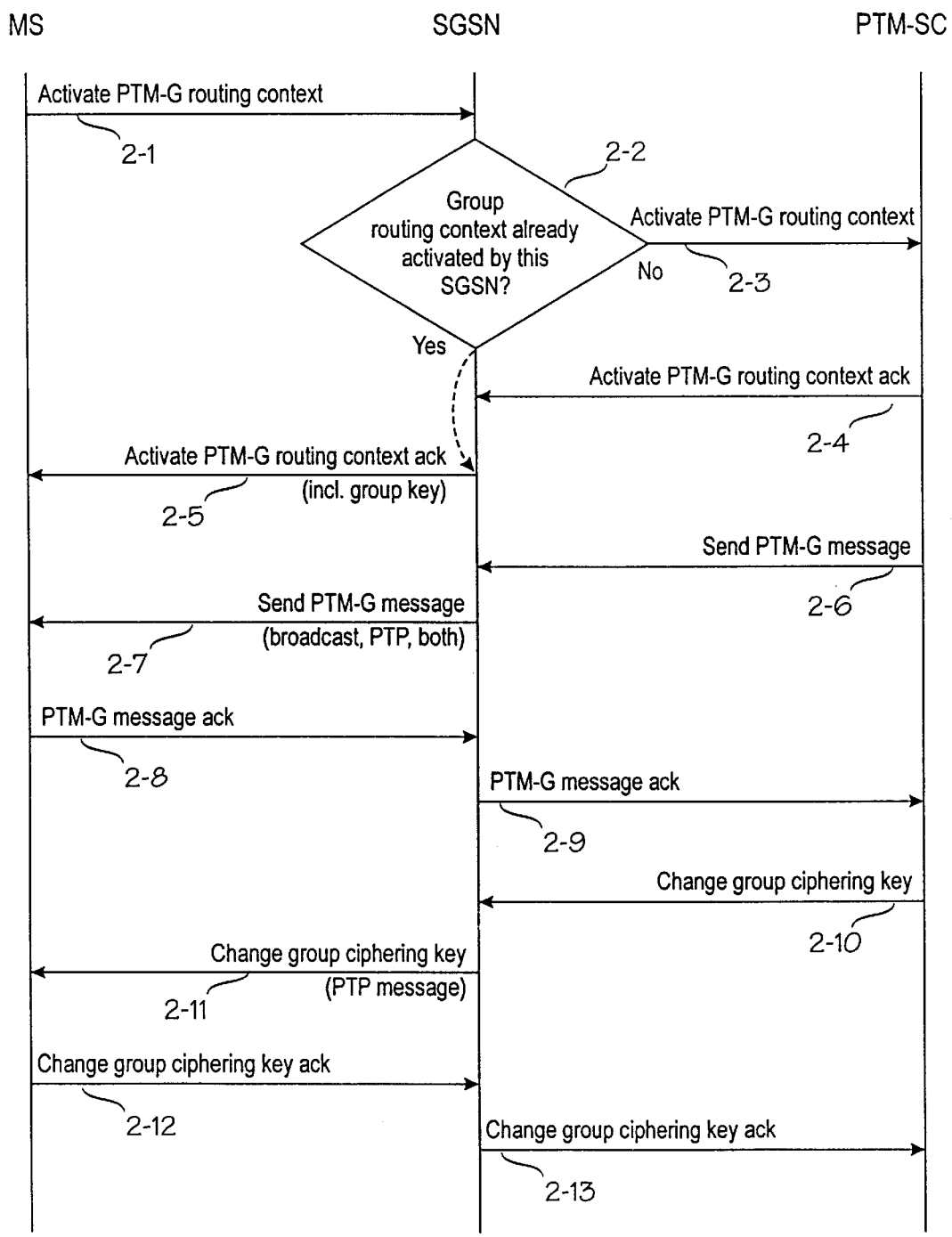
FIG. 2 is a signalling diagram which illustrates signalling between certain network elements in a packet radio system.

Reference is now made to FIG. 2. In step 2-1, when a mobile station MS joins a group, it has to activate a group routing context in the SGSN. A routing context is a context established in different GPRS nodes which allows a packet addressed to the MS to reach it. A group routing context will allow the group message to be routed to the group members by the PTM-SC and the SGSN. In one possible implementation, it consists of parameters indicating to the PTM-SC which SGSN (which has at least one group member) should receive the group message, and to each SGSN which group member MS should receive the group message. Then the SGSN knows that the mobile station MS is a member of the group, and the SGSN can send the group message to it. In step 2-2 the SGSN determines if a group routing context has already been activated for this group in the PTM-SC. If a group routing context has been activated for this group (i.e. there is already at least one group member registered in the SGSN), the process advances to step 2-5. However, if a group routing context has not been activated in the PTM-SC, the SGSN sends an Activate Group Context request to the PTM server PTM-SC in step 2-3. In step 2-4 the PTM-SC returns an acknowledgment of the activation request.

In step 2-5 an acknowledgment is sent to the mobile station MS. In this answer message Routing Context Activated, the SGSN will include the group ciphering key (a key common to the entire group) which may have been sent by the PTM server. (Alternatively, this key could also be generated by the SGSN).

This key can be changed periodically. In the example shown in FIG. 2, the PTM server sends a message called Change Group Ciphering Key to the SGSN. This message includes the new ciphering key. This instructs the SGSN to send a Change Group Key message to every mobile station MS of the group (typically over a PTM connection ciphered with the individual ciphering key of the MS). This key is different for every group. Steps 2-10 through 2-13 describe the process of changing the group ciphering key. Alternatively, the change of a group ciphering key can be acknowledged by the mobile station MS to the support node SGSN and by the SGSN to the PTM server PTM-SC.

It is only for the purpose of keeping FIG. 2 clear and simple that the steps 2-10 through 2-13 are drawn after (=below) the other steps. In reality, the PTM-SC can change the group ciphering key at any time. In FIG. 2 this means that the group of steps consisting of steps 2-10 through 2-13 could be located anywhere in relation to the other steps 2-1 through 2-9.

It is possible that a mobile station MS does not have the right group ciphering key either because it missed the key or because it does not have enough memory to store the key. Such a mobile station will not be able to listen to group messages when they are broadcast. In this case, according to an embodiment of the present invention, the support node SGSN will send the message using a Point-to-Point connection. Alternatively, if a mobile station MS cannot store the group ciphering key (due to lack of memory), it could inform the SGSN so that the SGSN knows that this mobile station MS cannot receive broadcast messages using the group ciphering key. Thus the SGSN does not have to send this change key message. It can also mark certain mobiles as not having the key. The SGSN might not take such mobile stations into account when it checks the criteria for broadcasting as it knows that such mobile stations can not listen to the broadcast messages.

Steps 2-6 through 2-9 relate to the way a group message is sent and acknowledged. In step 2-6, the PTM server PTM-SC will send the PTM-G message to all the support nodes SGSN that have reported having group members and cover the geographical area where the group message should be sent. Then in step 2-7, the support node SGSN will decide for each routing area how the group message should be sent. The SGSN can use either broadcast or point-to-point transmissions. The SGSN tries to estimate which transmission mode loads the critical parts of the network least (especially the air interface of a packet radio system).

If the criteria for broadcasting are fulfilled, the SGSN will broadcast the group message (ciphered with the group ciphering key). According to a preferred embodiment of the invention, the group message is broadcast using a predetermined schedule, such as broadcasting the group message n times at predetermined intervals.

If the criteria for broadcasting are not fulfilled, the SGSN will send the group message over a PTP connection to each group member. In performing the analysis to determine whether or not the criteria for broadcasting the message are fulfilled, the SGSN can use at least some of the following parameters: 1) The number of group members in the routing area able to receive broadcast messages. 2) The quality of service requested. 3) The number of cells in the routing area. 4) The number of group members currently transmitting (as they do not need to be paged and they have a higher probability of missing a broadcast message, which might affect the load calculation). 5) The fact that the same group message has just been broadcast (which decreases the probability that the mobile station MS which missed it will receive it). 6) The probability of a group member receiving a broadcast message correctly. It is only for the simplicity and clarity of FIG. 2 that all these transmission modes and their combinations have been combined into a single arrow 2-7. Advantageous algorithms for selecting the optimal transmission mode will be described later, in connection with FIG. 3.

In step 2-8, the mobile stations MS that receive correctly the entire group message will acknowledge it. Alternatively, the group members who did not receive the message correctly could send a negative acknowledgment to indicate that they missed the group message at least partially. It is useful to send this negative acknowledgment after a time-out long enough to ensure that no other broadcast transmissions are scheduled. It could also be useful in a GPRS system to avoid having to page these mobiles. If a PTP connection is used, the acknowledgment is a normal feature of a PTP transmission in a GPRS system. Each group message should be identified in a unique way so that the mobile station MS can delete the group message it has already received in a previous transmission. The same group message should not be acknowledged more than once. One way to indicate to a mobile station MS that a broadcast message has to be acknowledged, is to indicate it in the coding of the IMGI.

In step 2-9, the support node SGSN acknowledges the group message to the PTM server PTM-SC. Alternatively, it can indicate such parameters as the number or the percentage of subscribers who received the message correctly, or their identity (IMSI).

As soon as the support node SGSN has broadcast the message once and repeated it the scheduled n times, it will receive an acknowledgment from the mobile stations MS that received the message correctly. Then the support node SGSN can calculate the number of remaining group members in each routing area. On the basis of this number, the support node SGSN has to decide again how to send the PTM-G message. It will send it in broadcast form if this number is higher than a predetermined threshold.

When the remaining number of group subscribers (those who have not received the group message) is smaller than this threshold, the support node SGSN establishes an individual connection with each group member (similar to a normal PTP connection) and sends them the message using their own ciphering keys. An upper limit should be defined to the broadcast transmissions in order to prevent the SGSN from endlessly broadcasting the message to group members who are not reachable.

Alternatively, the support node SGSN indicates to the PTM server PTM-SC the mobile stations MS which were not reachable. According to an alternative embodiment of the present invention, the message is sent when the mobile stations MS become reachable before a certain time-out. In a way, this procedure is analogous to the short message service (SMS) in a GSM system where the HLR informs the PTM server PTM-SC that the MS is now reachable.

Criteria Establishment

Figure 3:
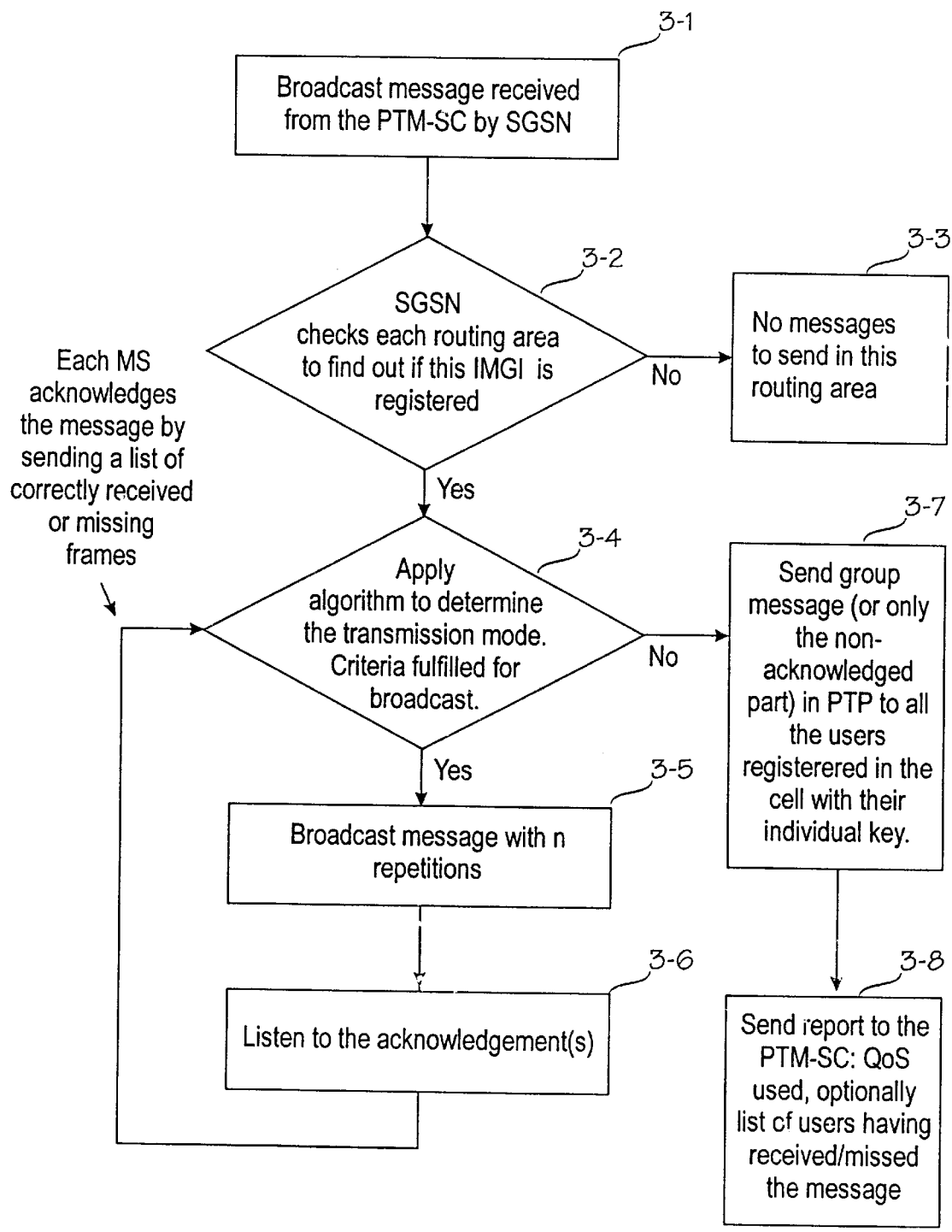
FIG. 3 is a flow chart which illustrates transmission of a group message.

Referring now to FIG. 3, a flow chart illustrating the decision making process will now be described. In step 3-1 the support node SGSN receives from the PTM server PTM-SC a group message including the identity of the group (IMGI) and the geographical area to which this group message should be sent. In step 3-2 the support node SGSN checks each routing area of this geographical area in order to find out whether at least one group member is registered or not. If none are registered, the SGSN determines in step 3-3 that there are no messages to send to this routing area. However, if X (X being at least equal to 1) group members are registered, the process advances to step 3-4 where the support node SGSN applies an algorithm to determine the optimal transmission mode (broadcast or point-to-point) for this number X. A suitable algorithm will be described below in greater detail. If the SGSN determines that the criteria for broadcasting are fulfilled, the process advances to steps 3-5 and 3-6 where the SGSN broadcasts the message with n repetitions and waits for the acknowledgments from the mobile stations MS. The process repeats the loop consisting of steps 3-4, 3-5 and 3-6 until the SGSN determines that a sufficient number of mobile stations MS have acknowledged reception of the message (or the loop has been repeated the maximum number of times) and the criteria for broadcasting are no longer fulfilled. At this point, the process advances to step 3-7 because the SGSN can make better use of the available resources by sending the group message over point-to-point connections to those mobile stations MS that have not acknowledged reception of the message. In step 3-8 the support node SGSN can send a report to the PTM server indicating the quality of service (QoS) used and optionally a list of subscribers that have received (or missed) the message.

One possible test for determining the optimal transmission mode will now be explained in greater detail. In the discussion, the following notation will be used:

"C" denotes the number of cells in the routing area.

"X" denotes the number of group members in the routing area.

"$X_c$" denotes the number of group members per cell ($X_c$=X/C).

"S(paging)" denotes the size of the paging message per cell.

"S(PTM-G)" denotes the size of the PTM-G message to be sent.

"S(ack)" denotes the size of the acknowledgment.

"p" denotes the probability of receiving a broadcast message correctly (this parameter depends on the size of the message, the number n of the times the message is broadcast, radio conditions, etc.)

If the message is transmitted over individual (=PTP) connections to all mobile stations of the group, the load generated can be calculated from:

$$L(I) = C*X*S(\text{paging}) + X*S(\text{PTM-G}) \quad [1]$$

If, however, the message is broadcast with n repetitions to all mobile stations of the group before being sent with PTM, the load generated can be calculated from:

$$L(B) = n*C*S(\text{PTM-G}) + X*p*S(\text{ack}) + C*X*(1-p)*S(\text{paging}) + X*(1-p)*S(\text{PTM-G}) \quad [2]$$

The criterion for broadcasting the message is: L(B)<L(I), or:

$$n*C*S(\text{PTM-G}) + X*p*S(\text{ack}) < p*C*X*S(\text{paging}) + p*X*S(\text{PTM-G})[3]$$

As we can assume that $X*p*S(\text{ack}) < p*C*X*S(\text{paging})$ is always true, the criteria will be fulfilled if:

$$n*C < X*p \quad [4]$$

If we use $X_C$ which has been defined as the number of group subscribers per cell, i.e. $C*X_C = X$, an even simpler formula can be obtained:

$$n < p*X_C \quad [5]$$

The value of p depends on many parameters, and it is difficult to know their values with good accuracy. These parameters include the number n of repetitions, the size of the message, and the transmission conditions. Thus it is difficult to calculate the value of p accurately, and in practice it can be determined experimentally by keeping track of the acknowledgments to previous messages. Ideally, the SGSN should maintain for each routing area an updated value of p which is calculated using the previous value measured. Let us assume for example that n=2, p=75% and $X_C$=4. These parameters fulfil the criteria because 2<3. In other words, the load generated by the method according the invention is more than ⅓ smaller than the load generated by prior art transmission methods. This advantage is most noticeable at the air interface in high-density areas, because it is very difficult to increase the capacity of the air interface. Very often, increasing the capacity of the air interface requires installations of additional base stations and/or reorganization of the frequency re-use pattern of several neighbouring base stations.

Alternative Embodiments

The support node SGSN or the PTM server PTM-SC can optionally divide long group messages into smaller frames. The SGSN can send these frames to the mobile stations MS, as already described in connection with a group message. Each frame should be uniquely identified. Alternatively, an indication that the frames are parts of a longer message could be included. For example, the frames could be numbered and the first and the last frame could be indicated. The MS could also acknowledge many frames in the same acknowledgment message. It could use a timer to ensure that no other broadcast retransmission are coming before sending an acknowledgment. According to an embodiment of the present invention, the SGSN only has to resend the frames that the mobile station failed to receive correctly. These frames could be resent over a broadcast connection (if many mobile stations MS missed the same frames) or over PTP connections. A surprising benefit of this embodiment is that by acknowledging other frames the MS also indicates its cell. Thus, there is no need to page the MS in order to send the PTP message.

According to yet another alternative embodiment of the invention, the PTM-SC knows which group members are registered in each routing area under each support node SGSN. Then the criteria for the transmission of the message could be defined in the PTM-SC instead of the SGSN. This embodiment preserves a simple SGSN which has to create a routing context for each group member in the PTM-SC and to forward all the acknowledgment to the PTM-SC. The PTM-SC will inform the SGSN of which packet to broadcast in which routing area and which packet to send over a PTP connection to which group members. The PTM-SC could also check whether the subscriber has a right to join a group.

With the increasing use of the PTM-G service, the method and arrangement of the present invention will save a considerable amount of resources on the air interface of a packet radio system. The invention will be found especially useful in areas where radio traffic is intense, such as city centers, premises of major corporations, etc. A considerable amount of resources can be saved if the number of subscribers per cell is typically five or more.

No hardware modifications are necessary in the network infrastructure. Instead, all modifications required for implementing the invention can be realized as additional or upgraded software routines of the SGSN and/or PTM server. Thus the invention can be implemented relatively easily in the network elements.

The additional memory required in mobile stations MS is limited to a small amount which is sufficient for storing additional ciphering keys. Even if the mobile station lacks this additional memory, the user is not prevented from using the group service. The user will only be prevented from listening to the broadcast messages.

The invention has been described by means of its preferred embodiments. However, the specifications for packet radio technology in general and GPRS in particular are developing rapidly. Such developments may require additional modifications to the invention. Therefore, all words and expressions should be interpreted broadly, and they are intended for describing rather than limiting the invention defined in the appended claims.

What is claimed is:

1. A method for transmitting group messages in a packet radio network comprising at least one support node (SGSN) and at least one group comprising a plurality of group members (MS), and at least one defined area, said support node (SGSN) knowing the identity of said group members (MS) in said area, wherein said network comprises:

broadcast connections between said support node (SGSN) and said plurality of group members (MS); and point-to-point connections between said support node (SGSN) and each one of said plurality of group members (MS);

characterized in that said method comprises performing the following steps at least once:

(i) keeping track of the group members (MS) that have not received said group message and determining whether or not their number exceeds a predetermined threshold;

(ii) in response to a positive determination in the previous step, transmitting said group message over a broadcast connection; and in response to a negative determination, transmitting said group message over a point-to-point connection to said group members (MS) that have not received said group message.

2. A method according to claim 1, further characterized in that said broadcast transmission is repeated a fist predetermined number of times at predetermined intervals.

3. A method according to claim 1, further characterized in that said predetermined threshold is formed by comparing the load generated by broadcast connections (L(B)) with the load generated by point-to-point connections (L(I)).

4. A method according to claim 1, further characterized in that during said broadcast connections at least some of the messages are ciphered using a group ciphering key common to said group and during said point-to-point connections at least some of the messages are ciphered using an individual ciphering key.

5. A method according to claim 4, further characterized in that said support node (SGSN) is arranged to distribute said group ciphering key using said ciphered point-to-point connections.

6. A method according to claim 1, further characterized in that said support node (SGSN) is arranged to keep track of said group members (MS) who are currently unable to receive said group message over said broadcast connection.

7. A method according to claim 6, further characterized in that said support node (SGSN) is arranged to transmit said group message over said point-to-point connection to said group members (MS) who are currently unable to receive said group message over said broadcast connection.

8. A method according to claim 1, further characterized in that said support node (SGSN) is arranged to keep track of the identity of said group members (MS) who received said group message and to forward this information to another network node (PTM-SC).

9. A method according to claim 1, further characterized in that said support node (SGSN) is arranged to keep track of the identity of said group members (MS) who did not receive said group message and to forward this information to another network node (PTM-SC).

10. A method according to claim 8, further characterized in that said other network node (PTM-SC) is arranged to transmit said group message to said group members (MS) who did not receive said group message when these group members (MS) become reachable.

11. A method according to claim 1, characterized in that the number of times said steps (i) through (ii) are repeated is limited to a second predetermined number.

12. A method according to claim 1, further characterized in that said first predetermined number (n) is calculated separately for each broadcast transmission.

13. A method according to claim 1, further characterized in that said group message is transmitted as frames, each frame comprising a subset of said group message, and each frame being acknowledged individually by each one of said group members (MS) that has received said frame correctly.

14. A method according to claim 1, further characterized in that said group message is transmitted as frames, each frame comprising a subset of said group message, and all frames of the same group message being acknowledged with a common acknowledgment by each one of said group members (MS) that has received said frame correctly.

15. A method according to claim 1, further characterized in that each one of said frames is retransmitted independently of the other frames, in response to a determination that it has not been received correctly by all group members (MS).

16. Network element (SGSN, PTM-SC) for a packet radio network comprising at least one support node (SGSN) and at least one group comprising a plurality of group members (MS), and at least one defined area, said support node (SGSN) knowing the identity of said group members (MS) in said area, wherein said network comprises:

broadcast connections between said network element (SGSN, PTM-SC) and said plurality of group members (MS); and point-to-point connections between said network element (SGSN, PTM-SC) and each one of said group members (MS);

characterized in that said network element (SGSN, PTM-SC) comprises:

means for keeping track of the group members (MS) that have not received said group message and means for determining whether or not their number exceeds a predetermined threshold;

means for transmitting said group message over a broadcast connection in response to a positive determination by said determining means; and means for transmitting said group message to said group members (MS) over a point-to-point connection in response to a negative determination by said determining means.

17. Network element (SGSN, PTM-SC) according to claim 16, further characterized in that said network element comprises a processor arranged to execute software routines and that said means are implemented as software routines.

* * * * *